Feb. 24, 1931.  A. E. SMITH  1,794,123
NUT LOCK
Filed Sept. 21, 1929
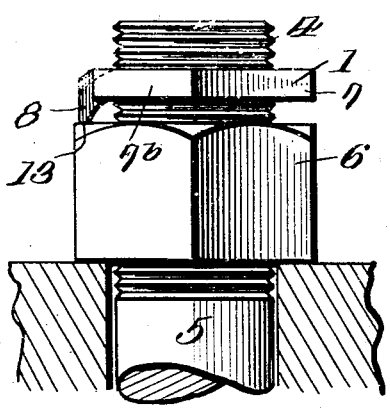
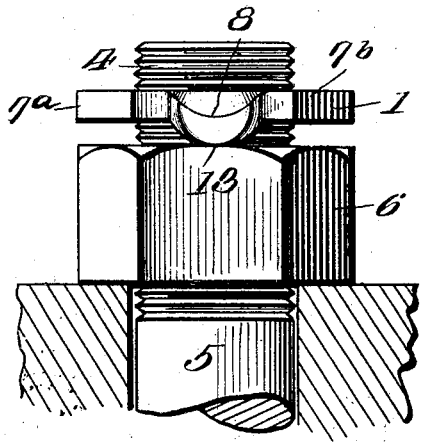
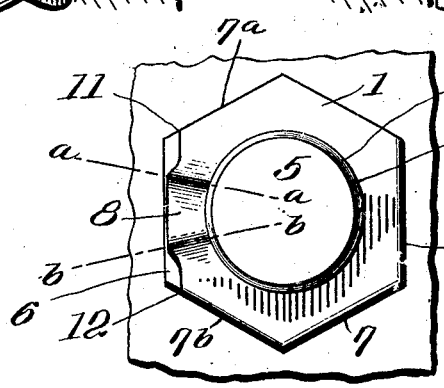
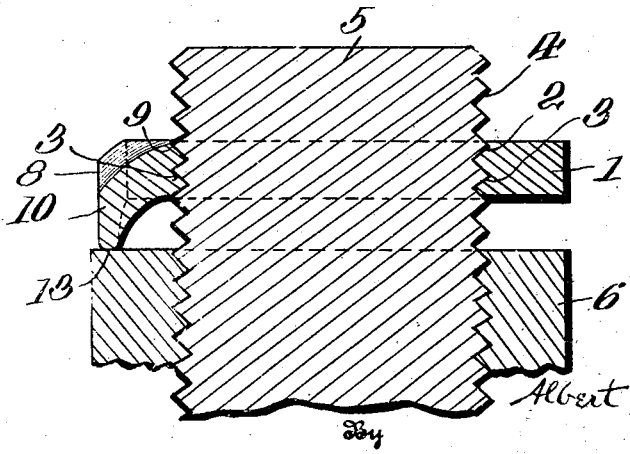
Inventor
Albert E. Smith
By Sturtevant & Mason
Attorneys Patented Feb. 24, 1931

1,794,123

UNITED STATES PATENT OFFICE

ALBERT E. SMITH, OF FREDONIA, NEW YORK, ASSIGNOR OF ONE-FIFTH TO JOHN C. BRENNAN, OF IROQUOIS, NEW YORK

NUT LOCK

Application filed September 21, 1929. Serial No. 394,264.

The invention relates to new and useful improvements in nut locks and more particularly to a nut lock which is separate from the nut and locks the nut by gripping engagement with the threads on the bolt carrying the nut.

An object of the invention is to provide a nut lock which operates to hold the nut in set position by a localized grip of the nut lock on the threads of the bolt carrying the nut.

A further object of the invention is to provide a nut lock of the above type wherein the abutment carried by the nut lock and engaging the nut makes a radial line contact with the nut.

A further object of the invention is to provide a nut lock which may be cheaply made by stamping and threading the metal forming the nut lock so as to produce a nut lock which has a localized gripping locking engagement with the threads of the bolt carrying the nut which is to be locked in set position.

These and other objects will in part be obvious and will in part be hereinafter more fully disclosed.

In the drawings:—

Fig. 1 is a side view looking in a direction endwise of the abutment projection and showing the nut lock as engaging and locking a nut on a bolt.

Fig. 2 is a side view of the same looking at the face of the abutment on the nut lock.

Fig. 3 is a plan view of the parts shown in Figs. 1 and 2.

Fig. 4 is a sectional view on the line 4—4 of Fig. 3, and also a section through a nut showing the locking nut gripping the threads and holding the nut in set position on the bolt.

The invention is directed broadly to a nut lock which includes a metal body portion having an opening provided with a standard size thread adapted for engagement with the thread on the bolt carrying the nut to be locked in its set position. The body portion is provided with uniformly disposed straight side portions for engagement by a wrench for turning the nut lock into engagement with the nut and for locking the same in set position. The nut lock is made from a sheet of metal by stamping and threading. The metal forming one of the sides of the lock nut is bent downwardly so as to provide an abutment projecting beyond the side face of the lock nut. This bending of the metal extends substantially from the threaded opening in the lock nut to the outer side edge thereof. The bending of the metal is preferably throughout a portion only of the side of the lock nut so as to reduce to a limited extent the size of the abutment and the portion of the metal which is bent at the threaded opening.

This bending of the metal at the threaded opening in a measure weakens the metal so that when under strain the portion of the thread within the region of the bending of the metal will yield so as to localize the gripping of the thread on the bolt by the lock nut. The under face of the abutment is convex so as to produce a radial line contact between the lock nut and the outer face of the nut which is to be locked in set position.

Referring more in detail to the drawings, the invention is shown as applied to a lock nut having a body portion 1 provided with an opening 2 which is threaded as indicated at 3. The threaded opening is of standard size for engagement with the threads 4 on the bolt 5 carrying the nut 6 which is to be secured in set position. The body portion 1 of the lock nut is provided with flat side faces 7, 7 adapted to receive a wrench for the turning of the lock nut.

As shown in the drawings, the lock nut has six flat faces. It is obvious, however, that the lock nut may be otherwise shaped and provided with other means for the turning of the same.

The portion of the lock nut between the side face 7a and 7b (Fig. 3) is shaped so as to provide an abutment 8 which projects beyond the face of the body portion of the lock nut. This abutment projects downwardly from the body portion of the lock nut when said lock nut is properly positioned on the bolt as clearly indicated in Figs. 1, 2 and 4 of the drawings. This abutment is formed by a bending of the metal in the region between the lines a—a and b—b. The metal curves downwardly from the point 9 to the point 10 (see Fig. 3). The point 9 is at the inner face of the threaded opening in the lock nut and the point 10 is at the outer face. The outer face of the bent down portion is flat and forms a section of the side wall 7 with which the wrench makes engagement for the turning of the lock nut.

The metal is cut away from the line a—a to the point 11 and from the line b—b to the point 12 so that the abutment may be formed by a bending of the metal and the metal turned from a horizontal position on its under face to a substantially vertical position at the extreme lower point of the abutment (see Fig. 4). It is well known that the bending of the metal weakens the metal to a certain extent. The region in which the metal is weakened at the threaded opening is that portion between the lines a—a and b—b. This is a very limited or localized section of the lock nut.

When the lock nut is turned down onto the bolt and brought into engagement with the nut to be locked the abutment engaging the nut will limit the movement of the portion of the nut between the lines a—a and b—b and this portion of the thread in the lock nut will be set slightly out of alignment with the remainder of the thread and thus bring about a localized gripping engagement of the lock nut with the thread on the bolt.

The securing of the lock nut to the bolt is not accomplished by a locking or threading of an undersize threaded body portion on the threaded bolt, but by a localized gripping engagement of the standard thread in the lock nut with the standard thread of the same size on the bolt to which it is applied. The under face of the abutment is convex so that the point of contact between the abutment and the upper face of the nut to be locked is a radial line contact, as indicated at 13 in the drawings. This radial line contact further localizes the forces to bring about this localized gripping action between the lock nut and the threads on the bolt. As noted above, the lock nut is made from sheet metal by stamping and threading operations. The body portion is cut and shaped so as to provide a central opening, the flat side faces and the projecting abutment in one operation. The opening is then threaded and the lock nut is finished. This provides a lock nut which may be very cheaply made and yet which is very efficient in the locking of a nut in any set position desired on the bolt which carries the nut.

It is obvious that minor changes in the details of construction may be made without departing from the spirit of the invention as set forth in the appended claim.

Having fully described my invention what I claim as new and desire to secure by Letters Patent is:—

A nut lock comprising a body portion having an opening therethrough provided with standard size threads for engagement with the threads on the bolt carrying the nut that is to be locked and having means whereby said nut lock can be turned, said body portion being bent in a restricted region extending from the threaded opening therein to the outer face thereof so as to provide an abutment for engagement with the nut to be locked the metal in said restricted region being weakened and adapted for better yielding under strain to cause a localized gripping engagement between the threads on the nut lock and the threads on the bolt for preventing the turning of the same on said bolt.

In testimony whereof, I affix my signature.

ALBERT E. SMITH.